Figure 1:
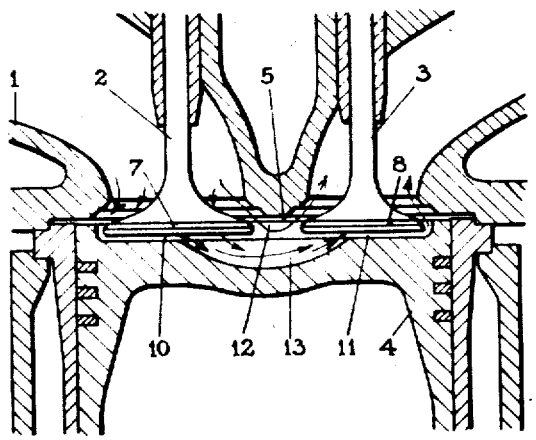

Oct. 16, 1951 A. BÜCHI 2,571,535
VALVE-CONTROLLED FOUR-STROKE CYCLE INTERNAL-COMBUSTION ENGINE
Filed Dec. 30, 1947 2 SHEETS—SHEET 1

Inventor
ALFRED BÜCHI

Patented Oct. 16, 1951

2,571,535

UNITED STATES PATENT OFFICE 2,571,535

VALVE-CONTROLLED FOUR-STROKE CYCLE INTERNAL-COMBUSTION ENGINE

Alfred Büchi, Winterthur, Switzerland

Application December 30, 1947, Serial No. 794,504
In Switzerland December 24, 1938

Section 1, Public Law 690, August 8, 1946
Patent expires December 24, 1958

5 Claims. (Cl. 123—32)

This invention relates to valve-controlled four stroke cycle internal combustion engines.

The invention is particularly concerned with the construction of valve controlled four cycle internal combustion engines provided with chambers arranged in advance of the cylinder space proper and into which the fuel is initially injected, the engines being particularly of the kind in which the combustion space is charged and scavenged. The invention is further concerned with such engines in which a part of the combustion space arranged in the cylinder is formed at least partly by a trough-like depression in the top surface of the piston, the upper edge of the piston located exteriorly beyond this trough extending in the outer piston dead center position closely up to the cylinder head.

According to the invention the trough-like depression in the top surface of the piston is so formed that the flow areas increase along the stretch between the inlet- and exhaust-valves up to a largest section between the two valves or groups of valves. To this end a number of recesses corresponding to the number of inlet and exhaust valves may be eccentrically arranged to the respective valve discs and so formed that the free space left circumferentially of the valve discs widens toward the narrower communication passages formed between the recesses.

By this measure it is intended to obtain a minimum of resistance for the stream of scavenging air flowing from the inlet valve to the exhaust outlet valve while the piston is in the outer dead center position, when the valves are simultaneously open.

With a view to further improving the conditions of flow between the recesses, the communication passage between the recesses accommodating the valve discs may be deepened in the direction of the piston axis in order to compensate for the narrowing of the stream areas, for example, by the presence of projecting tongues arranged between the valves for facilitating the setting up of turbulence, by accordingly deepening the passage. This deepening of the narrowed stream areas may be extended even partly under the valve discs.

The invention renders possible to realise the widening of the stream areas during the scavenging with the piston dwelling in the outer dead center position between the exhaust and suction strokes also in all cases where due to subdivision of the combustion space (in machines provided with means such as pre-combustion chambers, air receivers, turbulence chambers, or the like) the space available for combustion purposes between the pistons and the valves is considerably restricted. An efficient scavenging of the combustion space is, as is well known, the proper means for scientifically realising and enhancing the possibilities of increasing the efficiency of the engine afforded by the charging operation, owing to such a scavenging facilitating the removal of waste gas residues, the direct cooling, from within, of the hottest engine parts and the cooling down of the waste gases.

By the particular shaping of the portion of the combustion chamber arranged in the piston head, according to the invention, the passage of the scavenging air flowing from one valve to the other is improved in extremely space-saving manner. Furthermore, the recesses for the valves can nevertheless be adapted to the requirements as dictated by the particular mode of fuel injection used with a view to obtaining efficient turbulence of the fuel, for example, by means of a construction as nearly circular as possible and permitting the initiation of the turbulence by means of tangentially projected fuel-air streams.

Two embodiments of the invention are illustrated in the accompanying drawings in Figs. 1 to 4 representing a construction in which each cylinder is provided with an inlet and an exhaust valve. The invention is, however, also applicable to engines the cylinders of which are each provided with a plurality of inlet valves and exhaust valves.

In the drawings—

Figure 2:
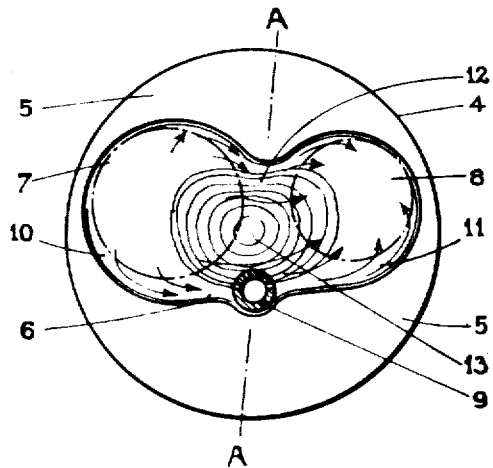

Figs. 1 and 2 show in a vertical section through the valve axis and a top plan view of the piston head the part of the combustion chamber located between the valves and the piston of an internal combustion engine operating by means of a pre-combustion chamber.

The numeral 1 designates the cylinder head of the internal combustion engine including an inlet valve 2 and an exhaust valve 3. The piston 4 is shown in the outer dead center position in which a portion of its top side 5, which is plane and circumferentially disposed, approaches the lower edge of the cylinder head very closely. The valves 2 and 3 are shown to be open, that is, in the positions for scavenging. A trough-like depression 6 in the piston 4 encircles the disc 7 of the inlet valve 2, the disc 8 of the exhaust valve 3, and the lowermost projecting part 9 of the insert of the pre-combustion chamber. The depression 6 comprises, according to the invention, two round shallow recesses 10, 11 encircling the valve discs 7, 8 in eccentric relation, and a communication passage 12 which is narrowed relatively to the recesses for the valve discs and is provided with an additional cavity 13 arranged in the piston 4 by which means, for example, along the section line A—A, enlarged flow-areas are obtained for the stream passing from the inlet valve to the exhaust valve as indicated by arrows. This cavity which is indicated in plan in Fig. 2 by curves indicating layers of different levels is in this instance in the form of an oblong trough, but may also have any other shape.

Figure 3:
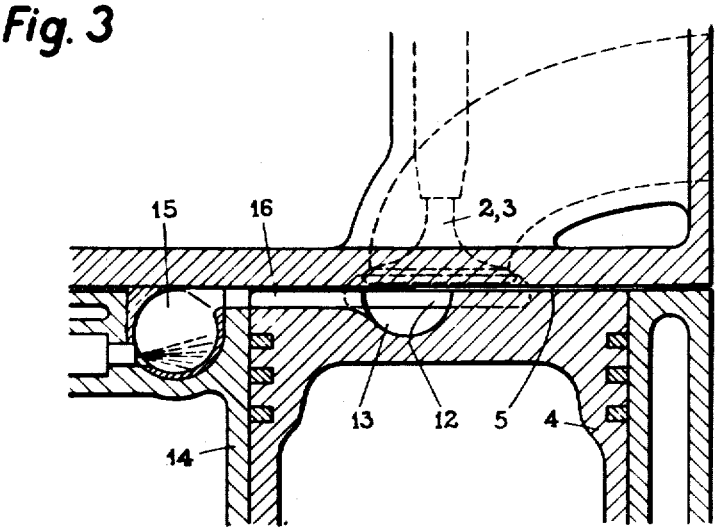
Figure 4:
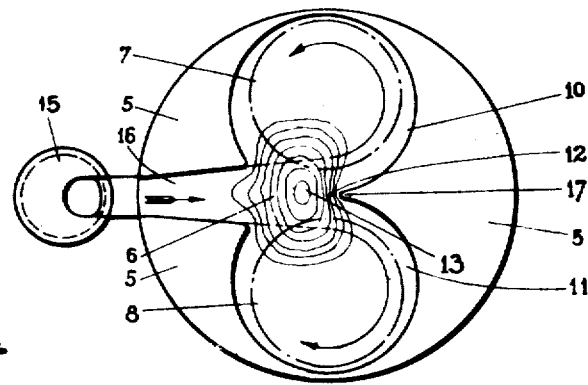

Figs. 3 and 4 show in an elevational and a plan view a second embodiment of the invention, consisting in a turbulence chamber engine, in the cylinder block 14 of which a spherical turbulence chamber 15 is included in which the initial partial combustion of the fuel injected thereinto takes place. In the operating phase illustrated the piston is in its ignition dead center position. The increased combustion pressure has the effect to expel the combustion gases together with the still unburnt fuel from the turbulence chamber 15 via a passage 16 into the depression 6 provided in the piston 4 between the latter and the valves 2, 3. In the round recesses 10, 11 encircling the valve discs 7 and 8, respectively, in eccentric relation, turbulence in opposite directions of rotation is produced by the fuel-gas jet entering from out of a passage 16, as indicated by arrows, the jet being divided and deflected by a tongue 17 projecting toward the jet to a considerable extent. This tongue 17 which is indispensable for the initiation of the whirling movement has, however, the effect to restrict the width of the communication passage 12 considerably between the two valve recesses 10, 11. In order to provide that in spite of this restriction ample flow-areas are obtained for the stream passing from valve 2 to valve 3 during the scavenging period, the passage 12 is additionally deepened by a cavity 13.

The invention can be used in connection with any other arrangement of a pre-combustion chamber, a turbulence chamber, or an air receiver, for example, arrangements in which these parts are disposed in the cylinder head proper, as long as the flow-areas of the trough provided in the piston in conjunction with the valve discs widen toward the central portion between the inlet and exhaust valves. This can be effected by arranging the valve recesses eccentrically relative to the respective valve axes, or by additionally deepening the trough at the restricted portion of the communication passage or at the points where deflector or projecting tongues are arranged on the piston head, or else by applying both these measures conjointly.

Having now particularly described and ascertained the nature of my said invention and in what manner the same is to be performed, I declare that what I claim is:

1. In a valve controlled four-stroke cycle internal combustion engine operating by means of scavenging and charging of the compression space and having a cylinder, a cylinder head covering and enclosing one end of said cylinder, intake and exhaust valves in said cylinder head opening into the closed end of said cylinder, said valves having valve discs which, as the valves open, extend into the cylinder, a piston reciprocating in said cylinder which piston approaches closely said cylinder head in outer dead center position, the combination therewith of a pre-combustion chamber into which fuel is injected, at least partially ignited therein and discharged therefrom with unburned fuel into the area of said cylinder immediately adjacent said cylinder head, a head for said piston, said piston head being recessed to form a trough-like depression within its circumference, said depression in the piston head serving to receive the discharge from the pre-combustion chamber and providing part of the combustion space, said depression having shallow areas adapted to receive the intake and exhaust valves in at least partly open position when the piston is in outer dead center position, and said depression having further a communication passage extending between said shallow areas, said passage being relatively constricted at a segment of its length intermediate said shallow areas, and said passage being increasingly deepened toward a point in the vicinity of said segment, thereby to increase the through-flow sections between the inlet and outlet valves and said segment to facilitate the flow of the stream of scavenging air between said valves.

2. In a valve-controlled four-stroke cycle internal combustion engine operating by means of scavenging and charging of the compression space and having a cylinder, a cylinder head covering and enclosing one end of said cylinder, intake and exhaust valves in said cylinder head opening into the closed end of said cylinder, said valves having valve discs which, as the valves open, extend into the cylinder, a piston reciprocating in said cylinder which piston approaches closely said cylinder head in outer dead center position, the combination therewith of a precombustion chamber into which fuel is injected, at least partially ignited therein and discharged therefrom with unburned fuel into the area of said cylinder immediately adjacent said cylinder head, a head for said piston, said piston head being recessed to form a trough-like depression within its circumference, said depression in the piston head serving to receive the discharge from the precombustion chamber and providing part of the combustion space, said depression having shallow areas adapted to receive the intake and exhaust valves in at least partly open position when the piston is in outer dead center position, and said depression having further a relatively constricted communication passage between said shallow areas, said passage being increasingly deepened up to the area of maximum constriction, and each of said shallow areas, for the purpose of facilitating the flow of the stream of scavenging air between the inlet and exhaust valves, being in eccentric relation to its respective valve disc and being widened so that the clearance space provided circumferentially of the valve disc widens toward the communication passage between the two shallow areas.

3. In a valve-controlled four-stroke cycle internal combustion engine operating by means of scavenging and charging of the compression space and having a cylinder, a cylinder head covering and enclosing one end of said cylinder, intake and exhaust valves in said cylinder head opening into the closed end of said cylinder, said valves having valve discs which, as the valves open, extend into the cylinder, a piston reciprocating in said cylinder which piston approaches closely said cylinder head in outer dead center position, the combination therewith of a precombustion chamber into which fuel is injected, at least partially ignited therein and discharged therefrom with unburned fuel into the area of said cylinder immediately adjacent said cylinder head, a head for said piston, said piston head being recessed to form a trough-like depression within its circumference, said depression in the piston head serving to receive the discharge from the precombustion chamber, and providing part of the combustion space, said depression having shallow areas adapted to receive the intake and exhaust valves in at least partly open position when the piston is in said outer dead center position, and said depression having further a communication passage extending between said shallow areas, said passage being relatively constricted at a segment of its length intermediate said shallow areas, and said passage being increasingly deepened toward a point in the vicinity of said segment, thereby to increase the through-flow sections between the inlet and outlet valves and said segment to facilitate the flow of the stream of scavenging air between said valves, and said communication passage being deepened by additional recessing of the piston head in the trough-like fashion as the constriction between the inlet and exhaust valves narrows.

4. In a valve-controlled four-stroke cycle internal combustion engine operation by means of scavenging and charging of the compression space and having a cylinder, a cylinder head covering and enclosing one end of said cylinder, intake and exhaust valves in said cylinder head opening into the closed end of said cylinder, said valves having valve discs which, as valves open, extend into the cylinder, a piston reciprocating in said cylinder which piston approaches closely said cylinder head in outer dead center position, the combination therewith of a precombustion chamber into which fuel is injected, at least partially ignited therein and discharged therefrom with unburned fuel into the area of said cylinder immediately adjacent said cylinder head, a head for said piston, said piston head being recessed to form a trough-like depression within its circumference, said depression in the piston head 45 serving to receive the discharge from the precombustion chamber, providing part of the combustion space, said depression having shallow areas adapted to receive the intake and exhaust valve in at least partly open position when the piston is in outer dead center position, and said depression having further a communication passage extending between said shallow areas, said passage being relatively constricted at a segment of its length intermediate said shallow areas, and said passage being increasingly deepened toward a point in the vicinity of said segment, thereby to increase the through-flow sections between the inlet and outlet valves and said segment to facilitate the flow of the stream of scavenging air between said valves, said communication passage being deepened by additional recessing of the piston head in trough-like fashion as the constriction between the inlet and exhaust valves narrows, and said trough-like deepened portion of the communication passage extending at least partly into the respective shallow areas wherein the valve discs are receivable.

5. In a valve-controlled four-stroke cycle internal combustion engine operating by means of scavenging and charging of the compression space and having a cylinder, a cylinder head covering and enclosing one end of said cylinder, intake and exhaust valves in said cylinder head opening into the closed end of said cylinder, said valves having valve discs which, as the valves open, extend into the cylinder, a piston reciprocating in said cylinder which piston approaches closely said cylinder head in outer dead center position, the combination therewith of a precombustion chamber into which fuel is injected, at least partially ignited therein and discharged therefrom with unburned fuel as a jet directed radially into the area of said cylinder immediately adjacent said cylinder head along a line normal to the line connecting the valve disc centers and substantially midway therebetween when the valves are at least partly extended into the cylinder, a head for said piston, said piston head being recessed to form a trough-like depression within its circumference, said depression in the piston head providing part of the combustion space and having shallow areas adapted to receive the intake and exhaust valves in at least partly open position when the piston is in outer dead center position, said depression having further a communication passage extending between said shallow areas, said passage being relatively constricted at a segment of its length intermediate said shallow areas, and said passage being increasingly deepened toward a point in the vicinity of said segment, thereby to increase the through-flow sections between the inlet and outlet valves and said segment to facilitate the flow of the stream of scavenging air between said valves, said piston head being so further recessed that the center of the wall defining that side of the trough-like depression opposite the precombustion chamber discharge exit forms a tongue pointing in the direction of the gas jet emitted from said chamber, and said piston head being further shallowly recessed to form a passage via which the gas from the precombustion chamber at approximately outer dead center position of the piston may be injected into the trough-like depression where the gas stream is split by the tongue into two streams thereby creating turbulence in opposite directions of rotation in the shallow areas adapted to receive the inlet and outlet valves to facilitate further combustion of the unburned fuel of said jet.

ALFRED BÜCHI.

REFERENCES CITED

The following references are of record in the file of this patent:

UNITED STATES PATENTS

| Number | Name | Date |
|---|---|---|
| 1,816,366 | Dinner | July 28, 1931 |
| 2,083,323 | Edwards | June 8, 1937 |

FOREIGN PATENTS

| Number | Country | Date |
|---|---|---|
| 134,542 | Austria | Aug. 25, 1933 |
| 475,179 | Great Britain | Feb. 7, 1936 |

Certificate of Correction

Patent No. 2,571,535                                                                  October 16, 1951

ALFRED BÜCHI

It is hereby certified that error appears in the printed specification of the above numbered patent requiring correction as follows:

Column 5, line 50, for "valve" read *valves*;

and that the said Letters Patent should be read as corrected above, so that the same may conform to the record of the case in the Patent Office.

Signed and sealed this 29th day of January, A. D. 1952.

[SEAL]

THOMAS F. MURPHY,
*Assistant Commissioner of Patents.*